US007089103B2

(12) United States Patent
Katakura et al.

(10) Patent No.: US 7,089,103 B2
(45) Date of Patent: Aug. 8, 2006

(54) CONTROL SYSTEM FOR CYLINDER CUTOFF INTERNAL COMBUSTION ENGINE

(75) Inventors: Takehiro Katakura, Wako (JP); Kenji Nakajima, Wako (JP); Hiroshi Terayama, Wako (JP); Shinichi Nishio, Wako (JP); Yoshiyuki Nagayama, Wako (JP); Hiroyuki Kushiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 10/871,766

(22) Filed: Jun. 17, 2004

(65) Prior Publication Data

US 2004/0259683 A1 Dec. 23, 2004

(30) Foreign Application Priority Data

Jun. 17, 2003 (JP) ............................ 2003-172008

(51) Int. Cl.
*G06F 17/00* (2006.01)

(52) U.S. Cl. ..................... 701/54; 123/198 F; 123/481; 123/493; 123/592; 477/111; 701/55; 701/117

(58) Field of Classification Search ................ 123/592, 123/198 F, 481, 493; 477/111; 701/54, 701/55, 117

See application file for complete search history.

(56) References Cited

U.S. PATENT DOCUMENTS 6,988,481 B1 * 1/2006 Sen et al. ................ 123/198 F

FOREIGN PATENT DOCUMENTS

| | | |
|---|---|---|
| JP | 05-071626 | 3/1993 |
| JP | 10-103097 | 4/1998 |
| JP | 10-141485 | 5/1998 |

* cited by examiner

*Primary Examiner*—Henry C. Yuen
*Assistant Examiner*—Katrina B. Harris
(74) *Attorney, Agent, or Firm*—Lahive & Cockfield, LLP; Anthony A. Laurentano, Esq.

(57) ABSTRACT

In a system for controlling an internal combustion engine having a plurality of cylinders and connected to the automatic transmission and mounted on a vehicle and the operation of the engine is switched between full-cylinder operation during which all of the cylinders are operative and cutoff-cylinder operation during which some of the cylinders are non-operative, based on at least the load of the engine, a gradient of road on which the vehicle runs is estimated and the cutoff-cylinder operation is prohibited when the estimated gradient is equal to or greater than a threshold value. With this, it becomes possible to generate sufficient deceleration, when the vehicle runs a downhill during cutoff-cylinder operation, while ensuring to prevent the operator to feel excessive acceleration.

18 Claims, 13 Drawing Sheets

MAP NUMBER

0 : STEEP-UPHILL MAP
1 : SLIGHT-UPHILL MAP
2 : LEVEL-ROAD MAP
3 : SLIGHT-DOWNHILL MAP
4 : STEEP-DOWNHILL MAP

FIG.8

| | | | 0←1 PNO01 | 1←0 PNO10 | PNO21 | PNO21 | | PKU23 | PKU32 | PKU34 | PKU43 |
|---|---|---|---|---|---|---|---|---|---|---|---|
| POSSIBLY-LARGEST MAP | MAP2 | 0 | 1 | 1 | 2 | 2 | 3 | 3 | 4 | 4 |
| POSSIBLY-SMALLEST MAP | MAP1 | 0 | 0 | 1 | 1 | 2 | 2 | 3 | 3 | 4 |

STEEP-UPHILL SLIGHT-UPHILL LEVEL-ROAD SLIGHT-DOWNHILL STEEP-DOWNHILL

CONTROL SYSTEM FOR CYLINDER CUTOFF INTERNAL COMBUSTION ENGINE

BACKGROUND OF THE INVENTION

1. Field of the Invention

This invention relates to a control system for a cylinder-cutoff internal combustion engine.

2. Description of the Related Art

In an internal combustion engine having a plurality of cylinders, it has been proposed to improve fuel consumption by switching engine operation, based on at least the engine load, between full-cylinder operation during which all of the cylinders are supplied with fuel to be operative and cutoff-cylinder operation during which the fuel supply to some of the cylinders are cut off or stopped to be non-operative. In this type of engine, since shock is occasionally generated due to the fluctuation of torque during engine operation switching, it has been proposed to eliminate shock by adjusting throttle opening during a transitional period of switching, as taught in Japanese Laid-Open Patent Application No. Hei 10 (1998) -103097, for example.

In a vehicle having this type of cylinder cutoff internal combustion engine whose operation is to be switched between full-cylinder operation and cutoff-cylinder operation, when the vehicle runs a downhill during cutoff-cylinder operation, deceleration may occasionally be not enough due to insufficient engine braking effect, or the operator may sometimes feel excessive acceleration depending on the gradient of the downhill.

SUMMARY OF THE INVENTION

It is therefore an object of this invention to eliminate the defects described above and to provide a system for controlling a cylinder cutoff internal combustion engine mounted on a vehicle and whose operation is to be switched between full-cylinder operation and cutoff-cylinder operation, that can generate sufficient deceleration, when the vehicle runs a downhill during cutoff-cylinder operation, while ensuring to prevent the operator to feel excessive acceleration.

The invention provides in an aspect a system for controlling an internal combustion engine mounted on a vehicle, comprising: an engine operation switcher that switches operation of the engine between full-cylinder operation during which all of the cylinders are operative and cutoff-cylinder operation during which some of the cylinders are non-operative, based on at least the load of the engine: a gradient estimator that estimates a gradient of road on which the vehicle runs; and a cutoff-operation prohibiter that prohibits the cutoff-cylinder operation when the estimated gradient is equal to or greater than a threshold value.

BRIEF DESCRIPTION OF THE DRAWINGS

The above and other objects and advantages of the invention will be more apparent from the following description and drawings, in which:

FIG. 8 is a chart showing selection of possibly-largest and possibly-smallest maps of the five maps;

DESCRIPTION OF THE PREFERRED EMBODIMENT

A control system for a cylinder cutoff internal combustion engine according to an embodiment of this invention will be described below with reference to the attached drawings.

Figure 1:
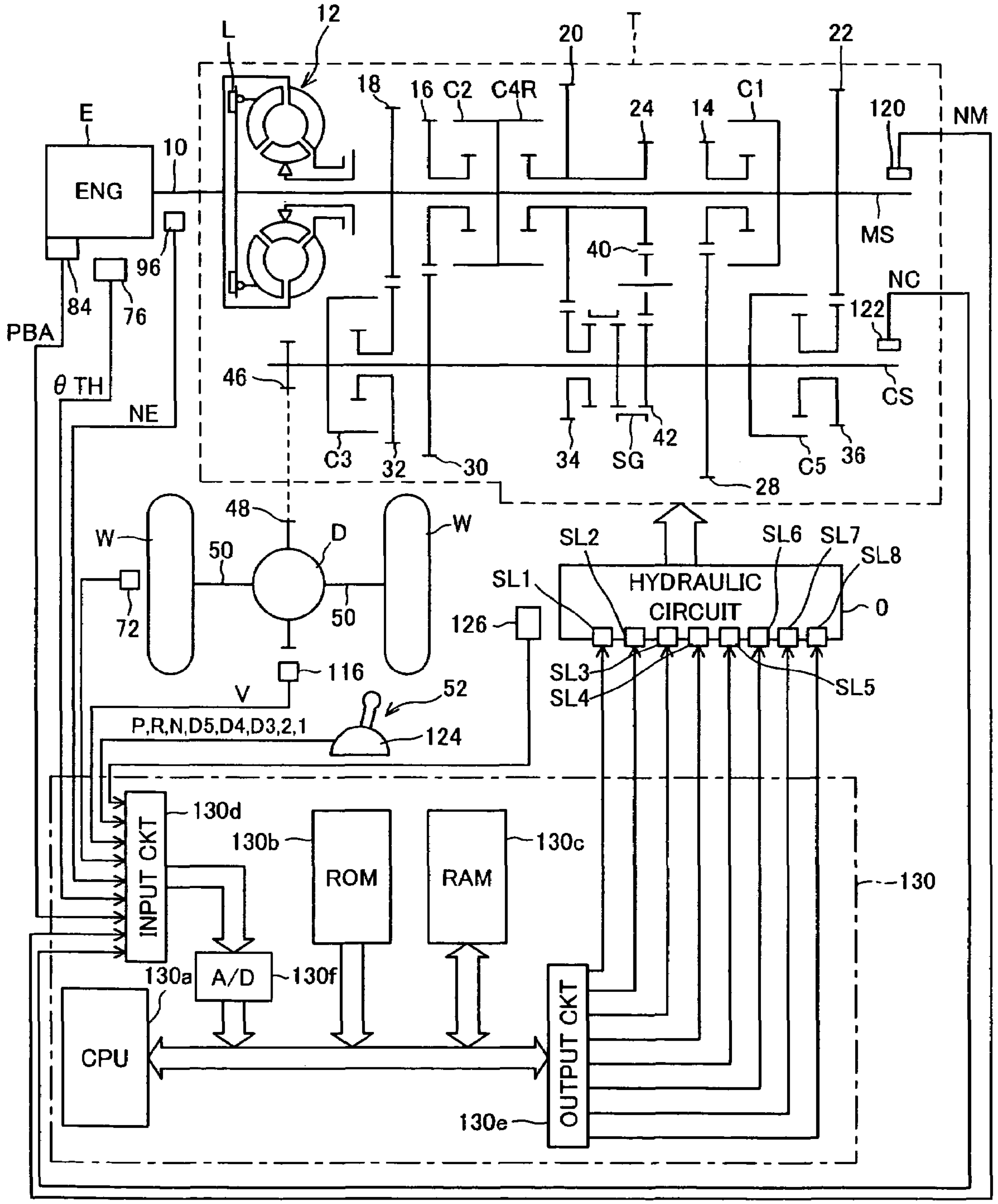
FIG. 1 is a schematic diagram showing the overall structure of a control system for a cylinder cutoff internal combustion engine connected to an automatic transmission to be mounted on a vehicle according to an embodiment of this invention.

FIG. 1 is a schematic diagram showing the overall structure of a control system for a cylinder cutoff internal combustion engine connected to an automatic transmission to be mounted on a vehicle according to the embodiment of this invention.

In the figure, reference symbol T indicates an automatic transmission (hereinafter simply referred to as "transmission"). The transmission T is mounted on a vehicle (not shown) and is configured to be a parallel-shaft-type having five forward gears (speeds) and one reverse gear (speed).

The transmission T has a main shaft (transmission input shaft) MS connected to a crankshaft 10 of an internal combustion engine (hereinafter referred to as "engine") E through a torque converter 12 having a lockup mechanism L, and a countershaft CS. These shafts carry gears.

More specifically, the main shaft MS carries a main first gear 14, a main second gear 16, a main third gear 18, a main fourth gear 20, a main fifth gear 22 and a main reverse gear 24. The countershaft CS carries a counter first gear 28 that meshes with the main first gear 14, a counter second gear 30 that meshes with the main second gear 16, a counter third gear 32 that meshes with the main third gear 18, a counter fourth gear 34 that meshes with the main fourth gear 20, a counter fifth gear 36 that meshes with the main fifth gear 22 and a counter reverse gear 42 that meshes with the main reverse gear 24 through a reverse idle gear 40.

1st gear (first-speed) is established when the main first gear 14 rotatably mounted on the main shaft MS is engaged with the main shaft MS by a first-gear hydraulic clutch C1. 2nd gear (second-speed) is established when the main second gear 16 rotatably mounted on the main shaft MS is engaged with the main shaft MS by a second-gear hydraulic clutch C2.

3rd gear (third-speed) is established when the third counter gear 32 rotatably mounted on the counter shaft CS is engaged with the counter shaft CS by a third-gear hydraulic clutch C3. 4th gear (fourth-speed) is established when the counter fourth gear 34 rotatably mounted on the countershaft CS is engaged with the countershaft CS by a selector gear SG and with this state maintained, when the main fourth gear 20 rotatably mounted on the main shaft MS is engaged with the main shaft MS by a fourth-gear/reverse hydraulic clutch C4R.

5th gear (fifth-speed) is established when the counter fifth gear 36 rotatably mounted on the counter shaft CS is engaged with the counter shaft CS by a fifth-gear hydraulic clutch C5. The reverse gear is established the counter reverse gear 42 rotatably mounted on the countershaft CS is engaged with the countershaft CS by the selector gear SG and with this state maintained the main reverse gear 24 rotatably mounted on the main shaft MS is engaged with the main shaft MS by the fourth-gear/reverse hydraulic clutch C4R.

The rotation of the countershaft CS is transmitted through a final drive gear 46 and a final driven gear 48 to a differential D, from where it is transmitted to driven wheels W, through left and right drive shafts 50, 50 of the vehicle on which the engine E and the transmission T are mounted.

A shift lever 52 is installed on the vehicle floor near the driver's seat (not shown) such that the operator can select one of the eight positions P, R, N, D5, D4, D3, 2 and 1.

Then, the Engine E will be explained in detail with reference to FIG. 2.

The engine E is constituted as a four-cycle V-type six-cylinder DOHC engine having three cylinders #1, #2, #3 on a right bank and three cylinders #4, #5, #6 on a left bank. A cylinder cutoff mechanism 62 is provided on the left bank of the engine E.

The cylinder cutoff mechanism 62 comprises an intake side cutoff mechanism 62*i* for cutting off (closing) the intake valves (not shown) of the cylinders #4 through #6, and an exhaust side cutoff mechanism 62*e* for cutting off (closing) the exhaust valves (not shown) of the cylinders #4 through #6. The intake side cutoff mechanism 62*i* and exhaust side cutoff mechanism 62*e* are connected to a hydraulic pump (not shown) via respective oil passages 64*i* and 64*e*. Linear solenoids (electromagnetic solenoids) 66*i* and 66*e* are disposed at a point on the oil passages 64*i* and 64*e* respectively to supply oil pressure or block the supply thereof to the intake side cutoff mechanism 62*i* and exhaust side cutoff mechanism 62*e*.

The oil passage 64*i* of the intake side cutoff mechanism 62*i* is opened when the linear solenoid 66*i* is deenergized, and when oil pressure is supplied, the contact between the intake valves and intake cams (not shown) of the cylinders #4 through #6 is released such that the intake valves enter a cutoff state (closed state). The oil passage 64*e* is opened when the linear solenoid 66*e* is deenergized, and when oil pressure is supplied to the exhaust side cutoff mechanism 62*e*, the contact between the exhaust valves and exhaust cams (not shown) of the cylinders #4 through #6 is released such that the exhaust valves enter the cutoff state (closed state). As a result, operations of the cylinders #4 through #6 are cut off, and the engine E enters cutoff-cylinder operation in which the engine E is operated by the cylinders #1 through #3 alone. In this state, the supply of fuel to the cylinders #4 through #6 are cutoff or stopped and become non-operative, so as to improve fuel consumption.

Conversely, when the linear solenoid 66*i* is energized such that the oil passage 64*i* closes and the supply of hydraulic fluid to the intake side cutoff mechanism 62*i* is blocked, the intake valves and intake cams of the cylinders #4 through #6 come into contact, and the intake valves enter an operative state (so as to be opened/closed).

When the linear solenoid 66*e* is energized such that the oil passage 64*e* closes and the supply of hydraulic fluid to the exhaust side cutoff mechanism 62*e* is blocked, the exhaust valves and exhaust cams (not shown) of the cylinders #4 through #6 come into contact, and the exhaust valves enter an operative state (so as to be opened/closed). As a result, the cylinders #4 through #6 are operated and the engine E enters full-cylinder operation wherein all of the cylinders are supplied with fuel and operative. Thus, the engine E is constituted as cylinder cutoff engine (internal combustion engine) which is capable of switching between full-cylinder operation and cutoff-cylinder operation.

A throttle valve 72 is disposed on an intake pipe 70 of the engine E to adjust the amount of intake air. The throttle valve 72 is connected to an electric motor 74 such that the mechanical coupling with the accelerator pedal is severed, and is driven by the electric motor 74 to open and close. A throttle position sensor 76 is provided in the vicinity of the electric motor 74 and outputs a signal corresponding to the position or opening (to be referred to later as "throttle opening") θTH of the throttle valve 72 in accordance with the amount of rotation of the electric motor 74.

Injectors (fuel injection valves) 80 are provided respectively in the vicinity of the intake ports of each cylinder #1 through #6 immediately after an intake manifold 78 disposed downstream of the throttle valve 72. The injectors 80 are connected to a fuel tank via a fuel supply pipe and a fuel pump (none of which are shown in the drawings), and is supplied with pressurized gasoline fuel from the fuel tank for injection.

The engine E is connected to an exhaust pipe (not shown) via an exhaust manifold 82, and the exhaust gas that is produced during combustion is discharged outside while being purified by a catalytic converter (not shown) provided at a point on the exhaust pipe.

A manifold absolute pressure sensor 84 and an intake air temperature sensor 86 are provided on the downstream side of the throttle valve 72 of the intake pipe 70 so as to output signals indicating a manifold absolute pressure (indicative of the engine load) PBA and an intake air temperature TA respectively. An engine coolant temperature sensor 90 is attached to a cooling water passage (not shown) of the cylinder blocks of the engine E so as to output a signal corresponding to an engine coolant temperature TW.

A cylinder discrimination sensor 92 is attached in the vicinity of the camshaft or crankshaft (not shown) of the engine E, and outputs a cylinder discrimination signal CYL at a predetermined crank angle position of a specific cylinder (for example, #1). A TDC sensor 94 and a crank angle sensor 96 are also attached to the camshaft or crankshaft of the engine E, and respectively output a TDC signal at a predetermined crank angle position relating to the TDC position of the piston of each cylinder and a CRK signal at shorter crank angle intervals (for example, thirty degrees) than the TDC signal.

An accelerator position sensor 104 is disposed in the vicinity of an accelerator pedal 102 which is installed on the floor surface of the operator's seat of the vehicle, and outputs a signal corresponding to a position (depression amount or accelerator position) AP of the accelerator pedal 102 that is operated by the operator. A brake switch 110 is provided in the vicinity of a brake pedal 106, and outputs an ON signal when the operator depresses (manipulates) the brake pedal 106 to operate the brake.

A group of auto-cruise switches (generally assigned with reference numeral 112) is provided in the vicinity of a steering wheel (not shown) which is provided at the operator's seat of the vehicle.

The group of auto-cruise switches 112 is manipulated by the operator, and comprises various switches for inputting operator's instructions such as a desired vehicle velocity during running control. More specifically, this switch group comprises a setting switch 112*a* for inputting an instruction to perform cruise control and a desired vehicle velocity, a resume switch 112*b* for resuming running control after running control has been interrupted by a brake operation or the like, a cancel switch 112*c* for canceling (ending) running control, an accelerate switch (a vehicle velocity increasing switch for inputting an instruction to increase the desired vehicle velocity) 112*d* for inputting an instruction to perform acceleration control in order to accelerate the vehicle velocity, a decelerate switch (a vehicle velocity decreasing switch for inputting an instruction to reduce the desired vehicle velocity) 112*e* for inputting an instruction to perform deceleration control in order to decelerate the vehicle velocity, a main switch 112*f* for enabling manipulation of the switches described above to be effective, a desired inter-vehicle distance setting switch 112*g* for inputting an instruction to perform preceding vehicle follow-up control (inter-vehicle distance control) and a desired inter-vehicle distance, a desired inter-vehicle distance increasing switch (inter-vehicle distance increasing switch) 112*h* for increasing the desired inter-vehicle distance, and a desired inter-vehicle distance decreasing switch (inter-vehicle distance decreasing switch) 112*i* for decreasing the desired inter-vehicle distance.

A radar 114 is provided in an appropriate position on the front bumper (not shown) or the like facing frontward of the vehicle. The radar 114 has a transmission unit and a reception unit (neither shown), such that electromagnetic waves are emitted frontward of the vehicle from the transmission unit and reflected by the preceding vehicle or the like. The reflected electromagnetic waves (reflected waves) are then received by the reception unit, whereby obstructions such as preceding vehicles are detected.

Returning to the explanation of FIG. 1, a vehicle speed sensor 116 is provided in the vicinity of the final driven gear 48 and generates a signal indicative of the vehicle traveling speed V each time the final driven gear 48 rotates for a predetermined range of angle. A first rotational speed sensor 120 is provided in the vicinity of the main shaft MS and generates a signal once every rotation of the main shaft MS and a second rotational speed sensor 122 is provided in the vicinity of the countershaft CS and generates a signal once every rotation of the countershaft CS.

A shift lever position sensor 124 is provided in the vicinity of the shift lever 52 and generates a signal indicating which of the aforesaid eight positions is selected by the operator. A temperature sensor 126 is provided in or near the transmission T and generates a signal indicative of a temperature of Automatic Transmission Fluid (TATF).

The outputs of the sensors and switches are sent to an ECU (electronic control unit) 130. For the sake of brevity, some of the sensors are omitted in FIGS. 1 and 2.

The ECU 130 is constituted as a microcomputer comprising a CPU (central processing unit) 130*a*, a ROM (read-only memory) 130*b*, a RAM (random access memory) 130*c*, an input circuit 130*d*, an output circuit 130*e* and an A/D converter 130*f*. The outputs of the sensors, etc., are inputted to the microcomputer from the input circuit 130*d*. Of the outputs, analog outputs are converted into digital values through the A/D converter 130*f* and are inputted to the RAM 130*c*, whilst digital outputs are subject to processing such as wave-shaping and are inputted to the RAM 130*c*.

Specifically, the outputs from the crank angle sensor 96 and the vehicle speed sensor 116 are counted by a counter(s) to detect the engine speed NE and the vehicle speed V. The outputs from the first and second rotational speed sensors 120, 122 are also counted to detect the input shaft rotational speed NM and the output shaft rotational speed NC of the transmission T. The ECU 130 also detects the inter-vehicle distance and relative velocity of the subject vehicle and a preceding vehicle based on the signals from the radar 114, and calculates the desired vehicle velocity from the detected values.

Further, the CPU 50 determines the gear (gear ratio) to be shifted to and energizes/deenergizes solenoid valves SL1 to SL5 of a hydraulic circuit O via the output circuit 130*e* and a voltage supply circuit (not shown) to switch shift valves and thereby shift gears, and energize/deenergize the solenoid valves SL6 to SL8 to control on/off operation of the lockup clutch L of the torque converter 12 and regulates the pressure applied to the hydraulic clutches. The solenoid valve SL6 regulates the hydraulic pressure to the lockup clutch L and the clutches C1, C2 and C4R, the solenoid valve SL7 regulates that to the clutches C2, C4R, and the solenoid valve SL8 regulates that to the clutches C3, C5.

Further, the ECU 130 executes calculations based on the inputted values to determine a fuel injection amount in order to open the injector 80, and to determine an ignition timing in order to control the operation of an ignition device (not shown). Also based on the inputted values, the ECU 130 determines a rotation amount (operating amount) of the electric motor 74 to control he throttle opening θTH to a desired throttle opening, and determines whether or not to energize the solenoids 66*i*, 66*e* in order to switch the operation of the engine E between full-cylinder operation and cutoff-cylinder operation.

The ECU 130 also performs running control on the basis of the inputted values, more specifically performs cruise control to cause the vehicle to run at the desired vehicle velocity set by the operator and preceding vehicle follow-up control (inter-vehicle distance control) to cause the vehicle to run while maintaining a predetermined inter-vehicle distance between itself and a preceding vehicle.

It should be noted that, in fact, the ECU 130 comprises a plurality of ECUs connected to be communicate with each other such that the gearshift control and engine control are divided among themselves.

The operation of gearshift control of the automatic transmission will be explained first.

Figure 3:
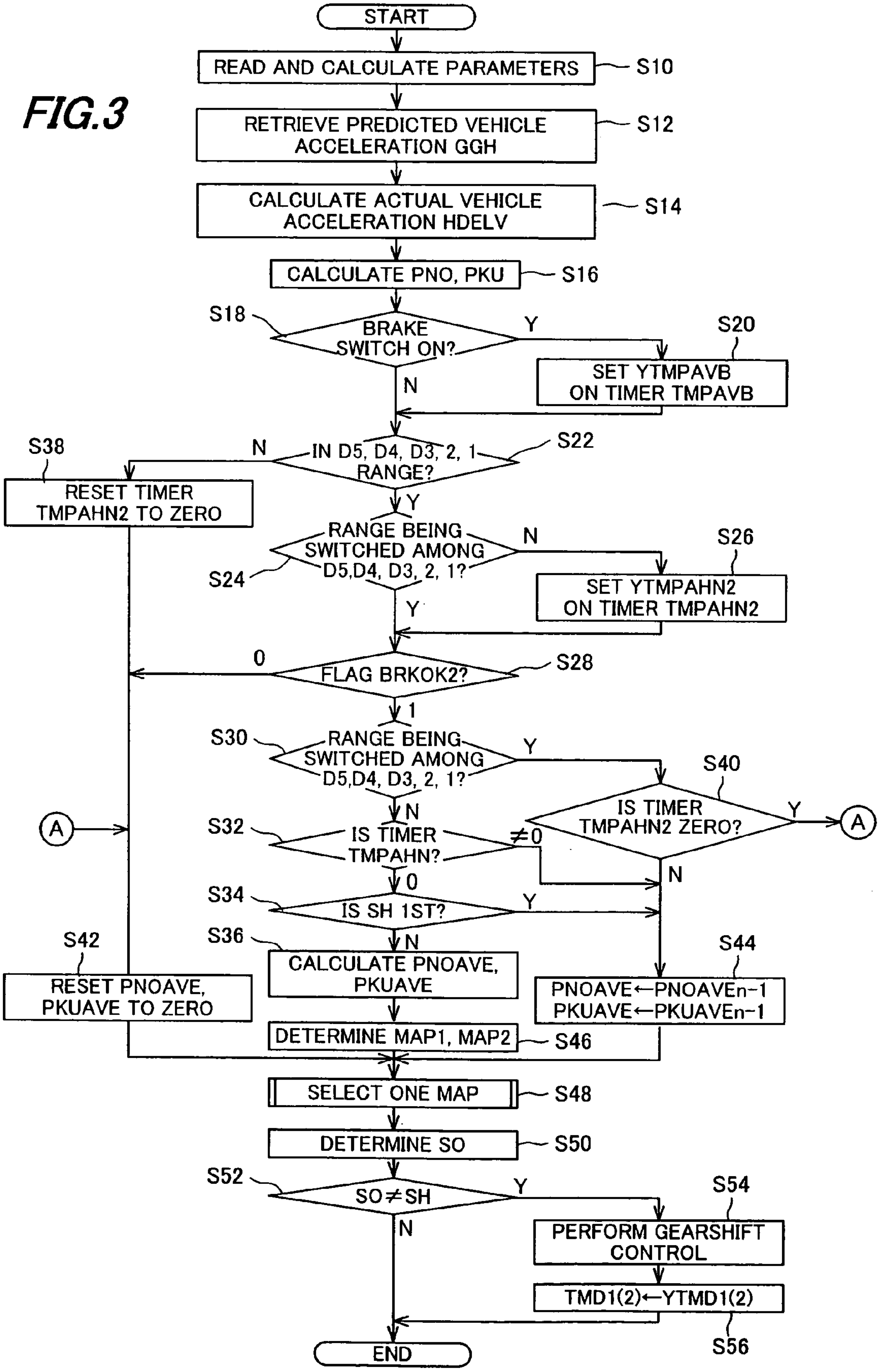
FIG. 3 is a flow chart showing the operation, more specifically the operation of a gearshift control of an automatic transmission illustrated in FIG. 1.

FIG. 3 is a flow chart showing this. The program illustrated there is executed once every time of 20 msec.

Before entering the explanation of the figure, since the gearshift control is based on a technique taught in Japanese Laid-Open Patent Application No. Hei 10 (1998)-141485, this proposed control will be outlined.

Figure 4:
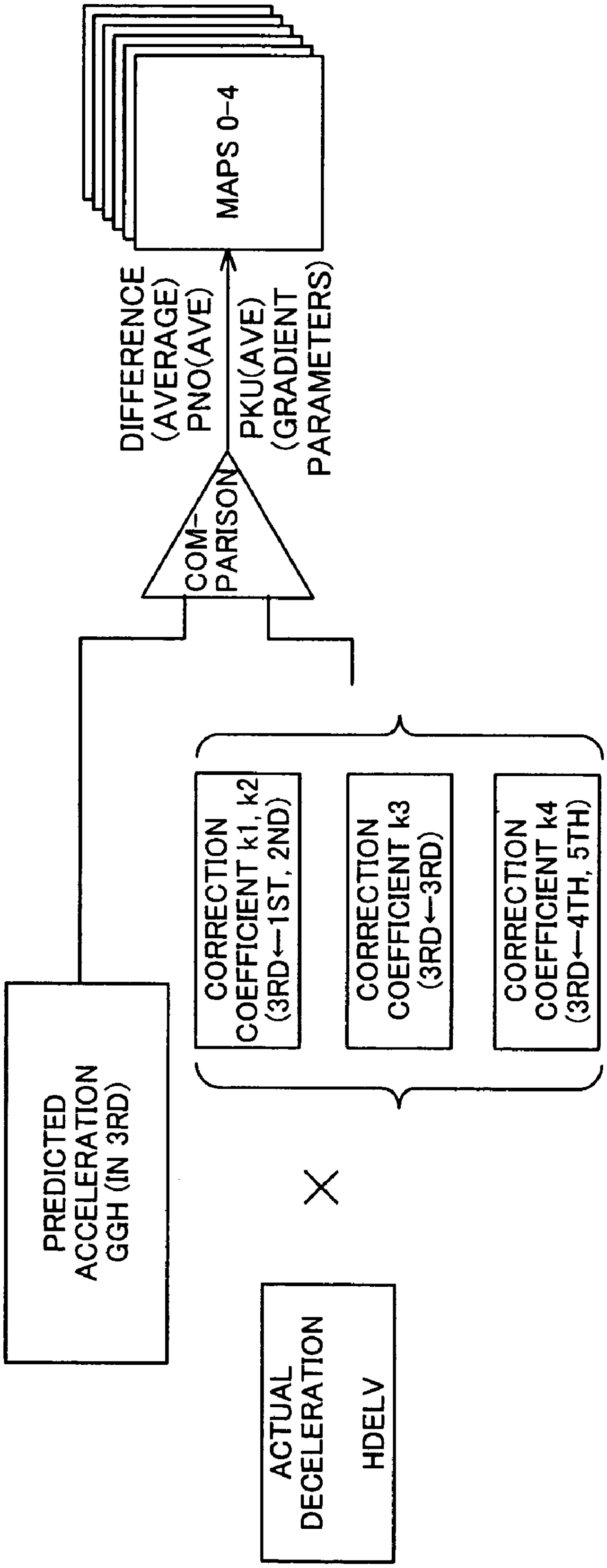
FIG. 4 is an explanatory view showing predicted and actual accelerations used in the gearshift control in the flow chart of FIG. 3.

In this control, as illustrated in FIG. 4, a predicted vehicle acceleration (named GGH) which the vehicle would have during running on a level road is prepared in advance as mapped data to be retrieved by the vehicle speed V and the throttle opening (engine load) θTH, whilst an actual vehicle acceleration (named HDELV) which the vehicle actually generates is calculated based on the vehicle speed V. Then a difference (named PNO or PKU, more specifically their respective average values PNOAVE, PKUAVE) between the actual vehicle acceleration HDELV and the predicted vehicle acceleration GGH is calculated as a gradient parameter indicative of a gradient of road on which the vehicle runs, to select one from among a plurality of gearshift programs (mapped data) set beforehand such that gear ratio is determined by retrieving the selected program using the detected vehicle speed V and throttle opening θTH.

Returning to the explanation of the flow chart, the program begins in S10 in which parameters including the vehicle speed V, the throttle opening θTH are read or calculated. The program then proceeds to S12 in which the predicted vehicle acceleration GGH is calculated. As mentioned above, the predicted vehicle acceleration GGH is prepared in advance as mapped data to be retrieved by the vehicle speed V and the throttle opening θTH.

The program proceeds to S14 in which the actual vehicle acceleration HDELV is calculated in the manner mentioned above, and proceeds to S16 in which the difference PNO or PKU between the predicted vehicle acceleration and the actual vehicle acceleration is calculated, to S18 in which it is determined whether the signal output from the brake switch 110 is ON. When the result in S18 is affirmative, the program proceeds to S20 in which a brake timer (down-counter) TMPAVB is set with a predetermined value YTMPAVB and is started to count down. The timer measures the time lapse since the brake pedal 106 is released.

The program then proceeds to S22 in which it is determined whether the range selected by the vehicle operator is D5, D4, D3, 2 or 1 and therefore needs the uphill/downhill control. When the result of S22 is affirmative, the program proceeds to S24 in which it is determined whether the range switching is in progress. When the result is negative, the program proceeds to S26 in which another timer (down-counter) TMPAHN2 is set with a predetermined value YTMPAHN2 and starts to measure time lapse to check whether the range switching is functioning properly.

The program then proceeds to S28 in which it is determined from the bit of a flag BRKOK2 whether the brake switch signal is 1 or 0. When the bit is 1 and the brake switch signal is determined to be normal, the program proceeds to S30 in which it is again determined whether the switching is in progress. When the result in S30 is negative, the program proceeds to S32 in which it is determined whether a value of a third timer TMPAHN (down counter) has reached zero. This timer is used for determining whether gearshift is in progress.

When it is determined in S32 that the timer value has reached zero, since this means that no gearshift is in progress, the program proceeds to S34 in which it is determined whether the gear (gear ratio) currently engaged (named SH) is 1st gear. When the result in S34 is negative, the program proceeds to S36 in which the average value (uphill/downhill gradient parameter) PNOAVE or PKUAVE of the difference PNO or PKU is determined by calculating a weighted average value between the current and last differences.

On the other hand, when the result in S22 is negative, the program proceeds to S38 in which the timer TMPAHN2 is reset to zero, and to S42 in which the average value of the difference is made zero. The same procedures will be taken when S28 finds that the brake switch signal is not normal.

When S30 finds that the range switching is in progress, the program proceeds to S40 in which it is determined whether the timer value TMPAHN2 has reached zero. Since this means that the range switching continues for a long period, it can be considered that a failure such as a wire breaking has occurred in the shift lever position sensor 124. As a result, the program proceeds to S42 in which the average value of the difference is made zero. When the result in S40 is negative, the program proceeds to S44 in which the average value of the difference is held to the value at the preceding cycle (n−1).

When S32 determines that gearshift is in progress, since it is not possible to determine the gear (gear ratio) to be shifted to and the actual vehicle acceleration is not stable, the program proceeds to S44. This is the same when the result in S34 is affirmative.

Figure 5:
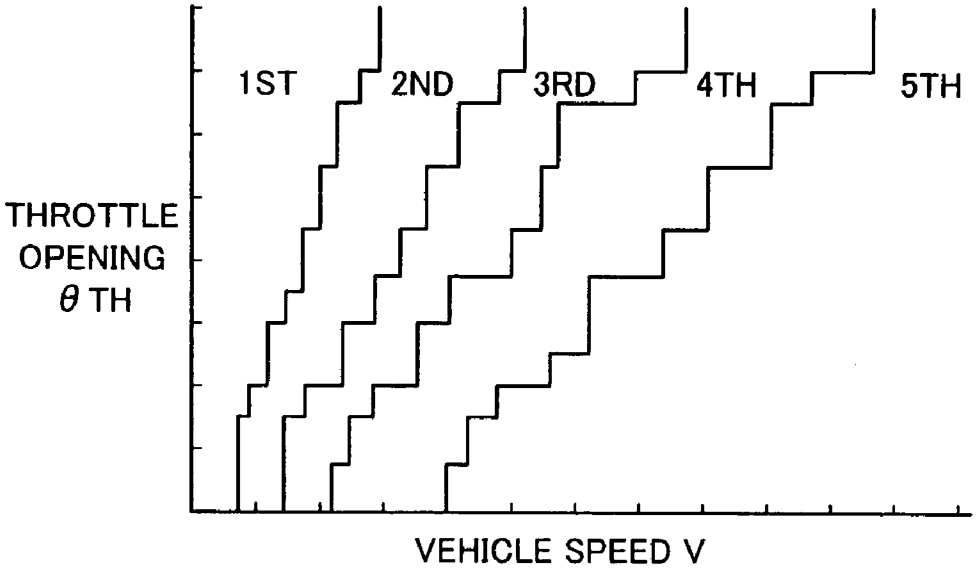
FIG. 5 is a graph showing the characteristic of a level-road map (mapped data, i.e., gearshift program) from among of five maps used in the gearshift control in the flow chart of FIG. 3.
Figure 6:
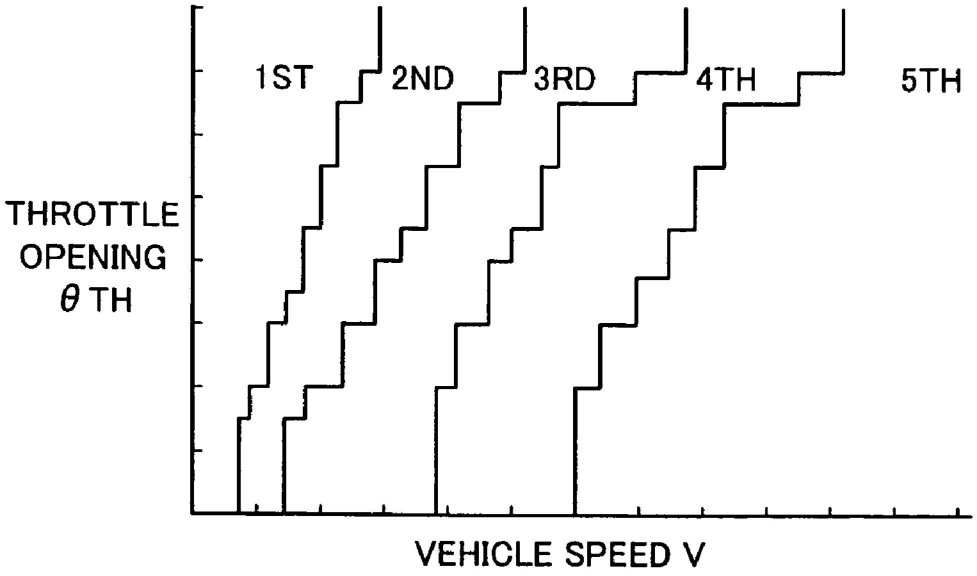
FIG. 6 is a graph, similar to FIG. 4, but showing the characteristic of a slight-uphill map (mapped data, i.e., gearshift program) from among of the five maps used in the gearshift control in the flow chart of FIG. 3.
Figure 7:
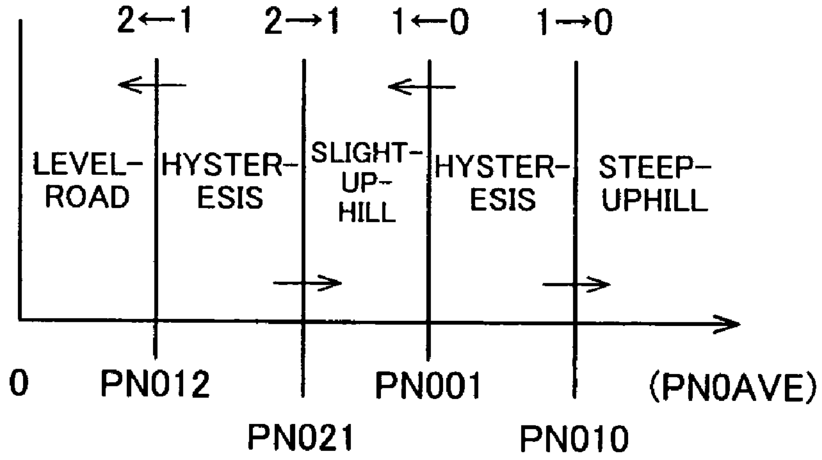
FIG. 7 is a chart showing the characteristics of the five maps relative to average values of uphill or downhill differences (gradient parameters)
Figure 7:
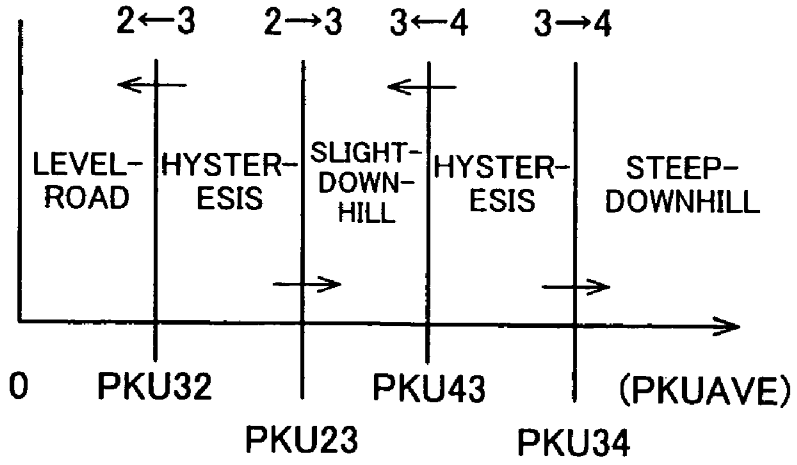

The program then proceeds to S46 in which a possibly-smallest map number (MAP1) and a possibly-largest map number (MAP2) are discriminated. In this control, as mentioned above, five maps (shift programs) comprising a steep-uphill map, a slight-uphill map, a level-road map, a slight-downhill map and a steep-downhill map are prepared and are identified by numbers from 0 to 4 in advance. FIG. 5 shows the characteristic of the level-road map and FIG. 6 shows that of slight-uphill map. The processing in S46 is to compare the average value of the difference PNOAVE or PKUAVE with reference values PNOnm, PKUnm and to determine, in terms of map number, the possibly-smallest map (MAP1) and the possibly-largest map (MAP2). as illustrated in FIGS. 7 and 8.

The program then proceeds to S48 in which one of the possibly-smallest map (MAP1) and the possibly-largest map (MAP2) is selected, and to S50 in which the selected map is retrieved by the detected vehicle speed V and throttle opening θTH to determine an output shift position SO (i.e., the gear to be shifted to). The program then proceeds to S52 in which it is determined whether the output shift position SO is not the same as the gear now engaged, in other words, it is determined whether gearshift is required. When the result is affirmative, the program proceeds to S54 in which the aforesaid shift solenoids SL1 and SL2 are energized to shift to the gear SO.

The program then proceeds to S56 in which a timer (down-counter) TMD1 is set with a predetermined value YTMD1 to start time measurement when the gearshift is downshift, whereas a similar timer TMD2 is set with a predetermined value YTMD2 to start time measurement when the gearshift is upshift. When the result in S52 is negative, since no gearshift is needed, the program is terminated.

Next, the operation of the control system of the cylinder cutoff internal combustion engine, more specifically general switching control operation between full-cylinder operation and cutoff-cylinder operation will be explained.

Figure 2:
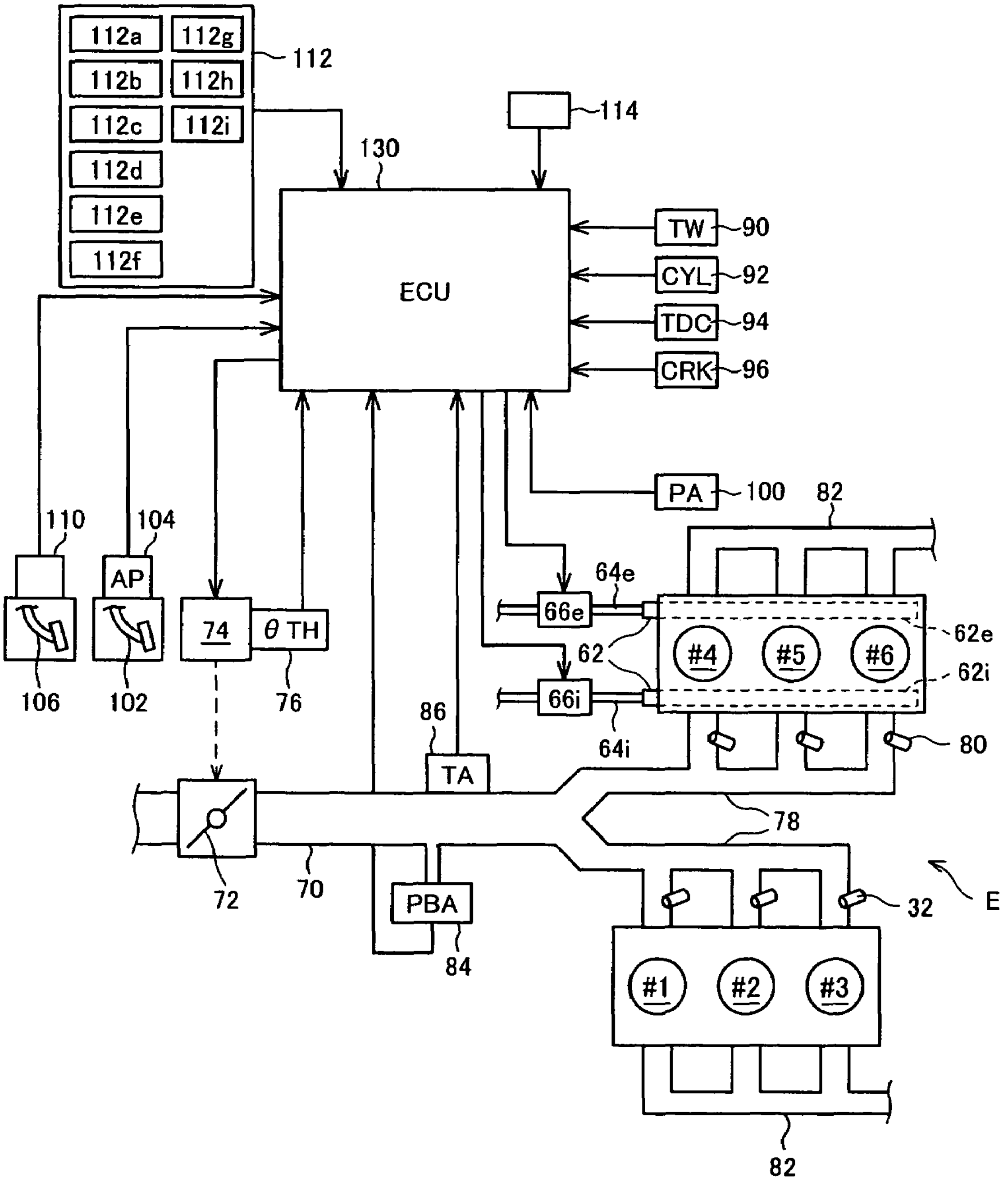
FIG. 2 is a schematic diagram showing the engine illustrated in FIG. 1.
Figure 9:
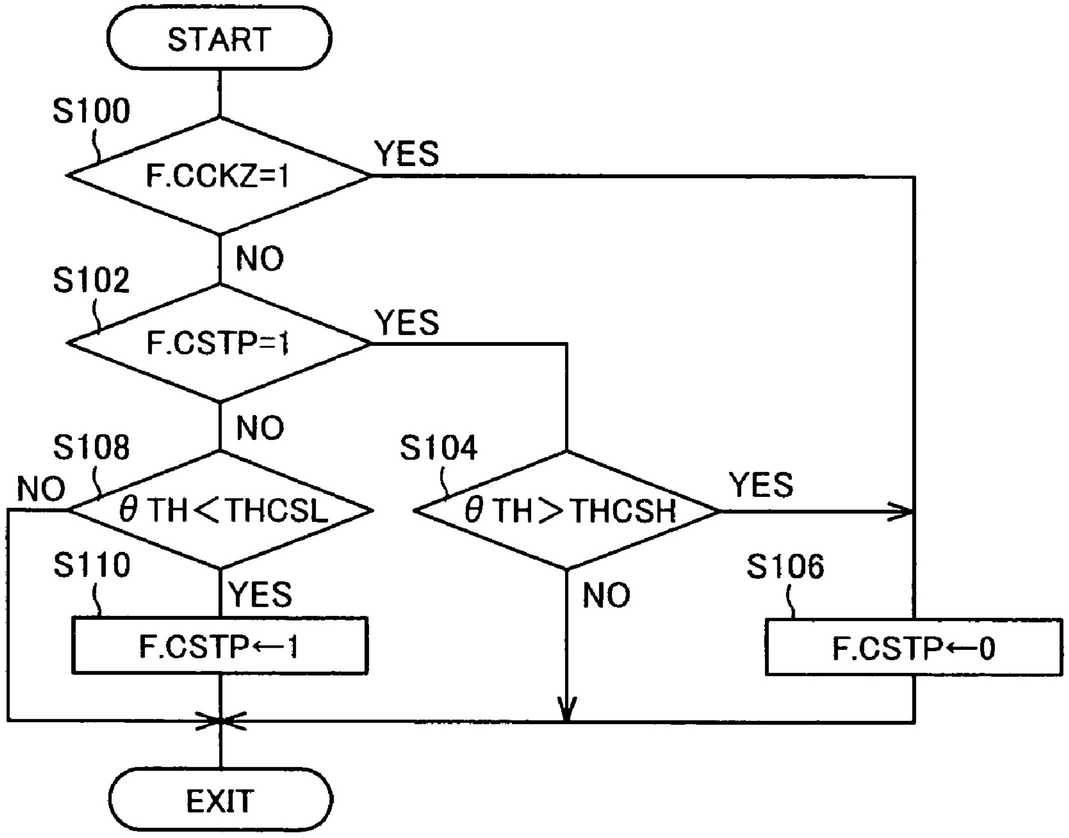
FIG. 9 is a flow chart showing the operation of the control system of the cylinder cutoff internal combustion engine, more specifically the operation of general switching of engine operation between full-cylinder operation and cutoff-cylinder operation, illustrated in FIGS. 1 and 2.

FIG. 9 is a flow chart showing the operation of the control system of the cylinder cutoff internal combustion engine, more specifically the operation of general switching of engine operation between full-cylinder operation and cutoff-cylinder operation, illustrated in FIGS. 1 and 2.

The program illustrated in the diagram is executed (looped) at TDC or a predetermined crank angle in the vicinity thereof, or at predetermined time intervals, e.g., 10 msec.

The program begins in S100 in which it is determined whether the bit of a flag F.CCKZ is set to 1. The bit of the flag F.CCKZ is set in a routine not shown by determining whether there is sufficient torque to maintain the current running state by distinguishing the behavior of the vehicle and engine load based on the engine speed NE, throttle opening θTH, manifold absolute pressure PBA, and so on. When the bit (initial value 0) is set to 1, it indicates that full-cylinder operation is required, and when the bit is reset to 0, it indicates that cutoff-cylinder operation is required.

When the result in S100 is negative, the program proceeds to S102 in which it is determined whether the bit of a flag F.CSTP (initial value 0) is set to 1. The bit of the flag F.CSTP is set in a manner as will be described below, and it indicates that the engine E should be operated by cutoff-cylinder operation when set to 1 and by full-cylinder operation when reset to 0.

If the result in S102 is affirmative and it is judged that cutoff-cylinder operation is in progress, the program then proceeds to S104 in which the detected throttle opening θTH is compared with a full-cylinder-operation-switching throttle opening threshold value THCSH for determining whether the detected throttle opening is larger than the threshold value THCSH, in other words whether the load of the engine E is large.

When the result in S104 is affirmative and it is determined that the load of the engine E is large, the program proceeds to S106 in which the bit of the flag F.CSTP is reset to 0 such that the engine E is operated by full-cylinder operation (switched to full-cylinder operation). If, on the other hand, the determination result in S104 is negative, the bit of the flag F.CSTP remains at 1 and cutoff-cylinder operation is continued.

If the result in S102 is negative and it is determined that full-cylinder operation is underway, the program proceeds to S108 in which the current throttle opening θTH is compared with a cutoff-cylinder-operation throttle opening threshold value THCSL for determining whether the condition that the detected value is less than the threshold value THCSL in other words it is determined whether the load of the engine E small.

When the result in S108 is affirmative and it is determined that the load of the engine E remains small, the program proceeds to S110 in which the bit of the flag F.CSTP is set to 1 and the engine E is operated by cutoff-cylinder operation (switched to cutoff-cylinder operation). If the result in S108 is negative, the bit of the flag F.CSTP is kept reset as 0 and full-cylinder operation is continued. When the result in S100 is affirmative, since full-cylinder operation is required, the program proceeds to S106 in which the bit of the flag F.CSTP is reset to 0 and the engine E is operated by full-cylinder operation.

Next, another operation of the control system of the cylinder cutoff internal combustion engine, more specifically the operation of specific switching of engine operation during uphill/downhill running, illustrated in FIGS. 1 and 2, will be explained.

Figure 10:
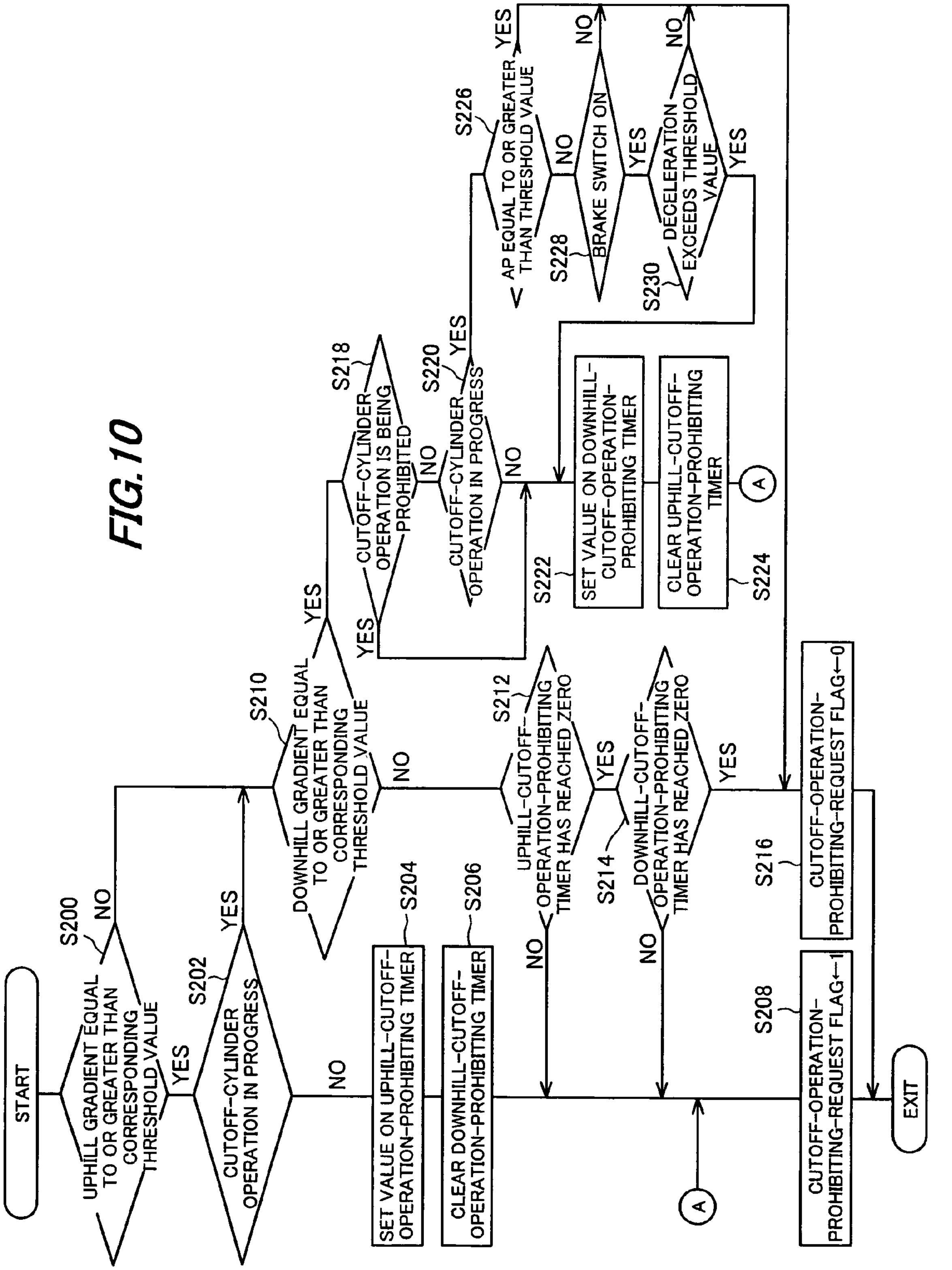
FIG. 10 is a flow chart showing another operation of the control system of the cylinder cutoff internal combustion engine, more specifically the operation of specific switching of engine operation during uphill/downhill running, illustrated in FIGS. 1 and 2.

FIG. 10 is a flow chart of this operation. The program illustrated in the diagram is also executed (looped) at TDC or a predetermined crank angle in the vicinity thereof, or at predetermined time intervals, e.g., 10 msec.

Figure 11:
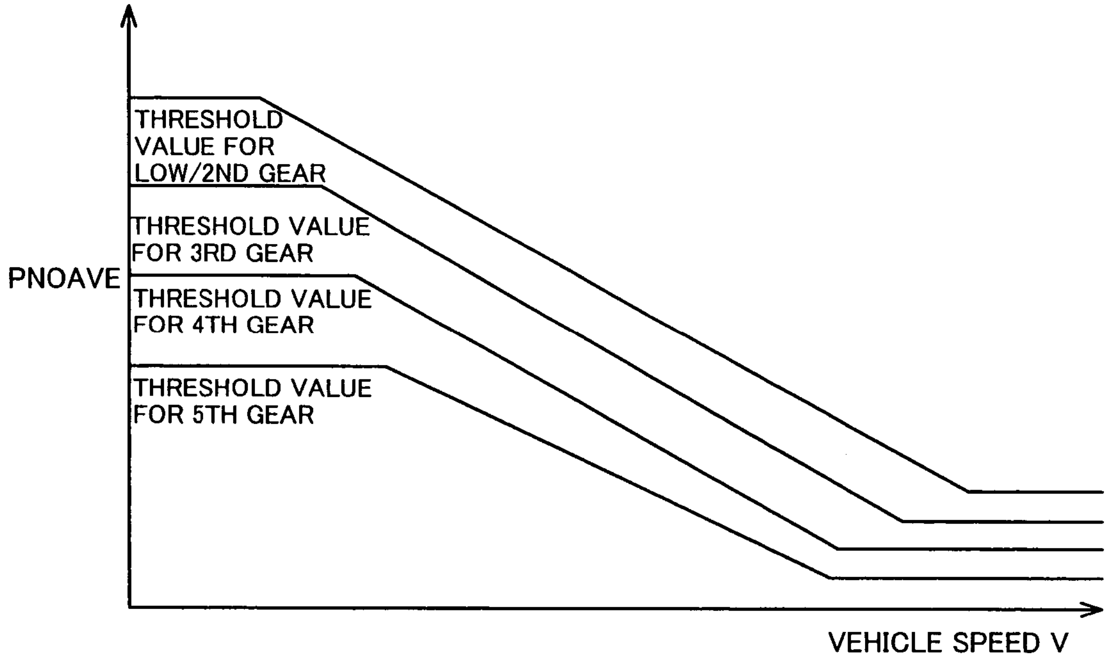
FIG. 11 is a graph showing the characteristics of uphill threshold values used in the flow chart of FIG. 10.

The program begins at S200 in which it is determined whether the uphill gradient is equal to or greater than a threshold value corresponding thereto. As illustrated in FIG. 11, the threshold values are set separately for the five gears (gear ratios), i.e., 1st gear LOW plus 2nd gear (2ND) to fifth gear (5TH).

As seen from the characteristics illustrated there, these threshold values are set for the uphill gradient parameter PNOAVE relative to the vehicle speed V in such a manner that they increases with increasing gear ratio and decrease with increasing vehicle speed V. This group of threshold values are that for uphill and similar group of threshold values are set for downhill (explained below).

In the processing at S200, one of the threshold value characteristics is selected in response to the gear now being engaged and the threshold value is determined by retrieving the selected characteristic by the detected vehicle speed V and it is determined whether the uphill gradient is equal to or greater than the threshold value by comparing the calculated uphill gradient parameter PNOAVE with the determined threshold value. The value PNO may instead be used in the comparison.

Here, again discussing the object of this invention, when the road on which the vehicle run changes from a level road or an uphill to a downhill during cutoff-cylinder operation, deceleration may occasionally be not enough due to insufficient engine braking effect, or the operator may sometimes feel excessive acceleration depending on the gradient of the downhill.

Uphill climbing may also involve a problem. When climbing an uphill, the engine operation can be switched to cutoff-cylinder operation depending on the throttle position θTH (more specifically the accelerator position AP), as mentioned above with reference to FIG. 9. However, if the cutoff-cylinder operation can not be maintained due to the increase of the load of vehicle body, the operation will be again switched to full-cylinder operation. Thus, the engine operation can be unnecessarily switched to cutoff-cylinder operation and vise versa during uphill running. As a result, in response thereto, the control of the lockup mechanism L of the torque converter will also be unnecessarily switched between a coupling control and a slippage control.

In view of the above, in this embodiment, the cutoff-cylinder operation is prohibited when the uphill gradient or downhill gradient is equal to or greater than the threshold value corresponding thereto.

And for that reason, the characteristics of the group of threshold values are set as shown in FIG. 11. To be more specific, since the gradient that allows vehicle running with cutoff-cylinder operation increases as the gear number decreases (as the gear ratio increases), the threshold values are each set to be increased with decreasing gear number such that cutoff-cylinder operation is less likely to be prohibited.

Figure 12:
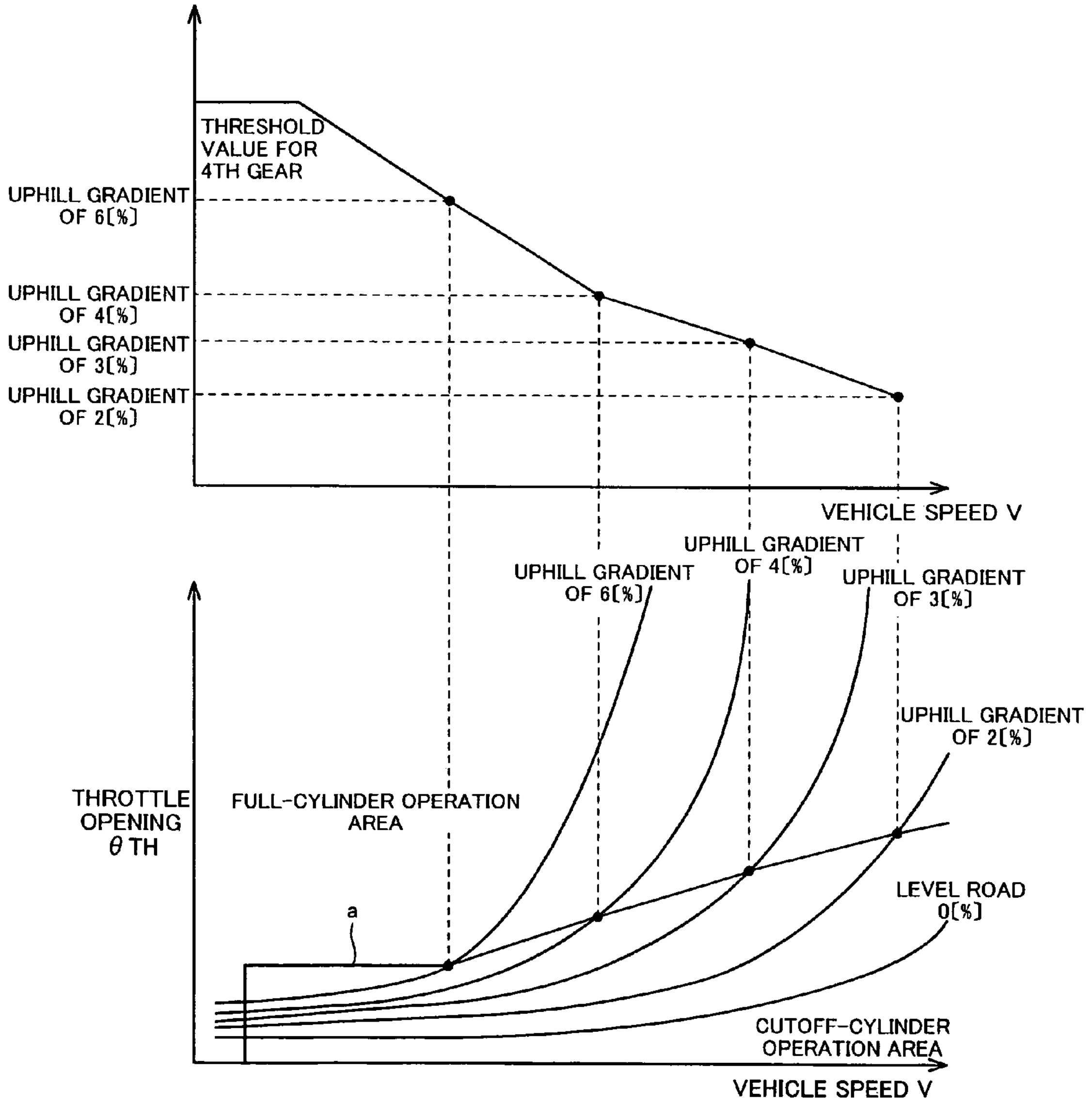
FIG. 12 is a set of graphs showing the reason why the uphill threshold values are set as illustrated in FIG. 11.

The reason why the characteristics are thus set will be further explained with reference to FIG. 12. The figure is a set of explanatory graphs proving the reason taking the fourth gear as example. In the lower graph, line marked with a indicates a boundary of cutoff-cylinder operation area and full-cylinder operation area defined by the throttle opening θTH and vehicle speed V, and a group of curves indicate running resistances at different uphill gradients corresponding thereto. The gradient is expressed by a product (of quotient obtained by dividing the height of road in side view by the horizontal length) multiplied by 100%.

In the lower graph, each point of intersection of the line a and running resistance indicates the critical or marginal limit of cutoff-cylinder operation at that gradient. The points of intersection are illustrated in the upper graph set to the same uphill gradients as those mentioned in the lower graph. The thick line in the upper graph (indicating the characteristic of threshold value of the 4th gear illustrated in FIG. 11) is a line thus obtained by plotting the points of intersection. Although not shown, the other characteristics shown in FIG. 11 are lines obtained in a similar manner.

Thus, the threshold values for uphill are each set based on the running resistances at different gradients and the critical points of cutoff-cylinder operation. And, the threshold values are each set to be decreased with increasing vehicle speeds as shown in the figure. Since the uphill gradient that the vehicle can climb under cutoff-cylinder operation at that gear (e.g., 4th gear) decreases, the threshold values are set in such a manner that cutoff-cylinder operation is likely to be prohibited as the vehicle speed increases.

Returning to the explanation of FIG. 10, when the result in S200 is affirmative, since this indicates that the vehicle runs on an uphill of gradient equal to or greater than the corresponding threshold value, the program proceeds to S202 in which it is determined whether cutoff-cylinder operation is in progress. When the result is negative, since this indicates that full-cylinder operation is in progress, the program proceeds to S204 in which a predetermined value (indicative of a predetermined period of time) is set on an uphill-cutoff-operation-prohibiting timer (down-counter) to start time measurement.

The program then proceeds to S206 in which another timer of downhill-cutoff-operation-prohibiting timer (down-counter, explained below) is cleared (i.e., is reset to zero), since that for uphill side is started. The program then proceeds to S208 in which the bit of a cutoff-operation-prohibiting-request flag is set to 1. To set the bit of this flag to 1 indicates that a request to prohibit cutoff-cylinder operation is made. This is the same as to set the bit of the flag F.CCKZ to 1 to request full-cylinder operation.

On the other hand, when the result in S200 is negative, the program proceeds to S210 in which it is determined whether the downhill gradient is equal to or greater than a downhill threshold value corresponding thereto.

Figure 13:
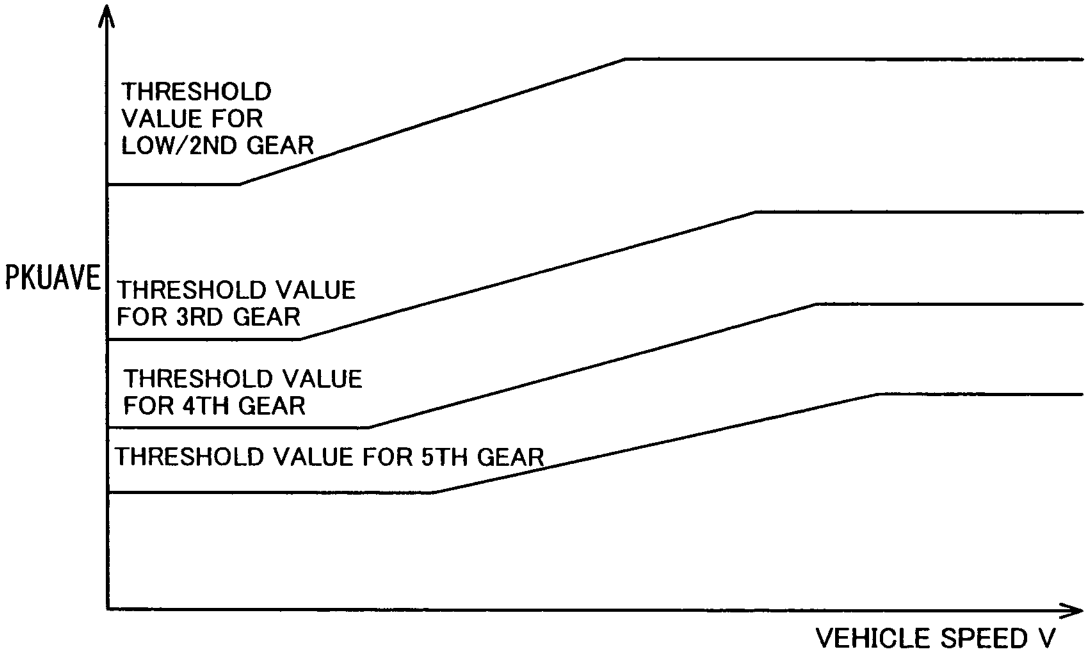
FIG. 13 is a graph showing the characteristics of downhill threshold values used in the flow chart of FIG. 10.

FIG. 13 is a graph showing the characteristics of the down-hill threshold values. As illustrated, the down-hill threshold values are set with the downhill gradient parameter PKUAVE and are similarly set for the respective gears relative to the vehicle speed V. The characteristics of the downhill threshold values are set to be different from those of the uphill threshold values, as will be understood when compared FIG. 13 to FIG. 11. Similarly in the processing at S210, one of the downhill threshold values is selected from the gear now engaged and the detected vehicle speed V and is compared with the calculated downhill gradient parameter PKUAVE to determine whether the downhill gradient is equal to or greater than the downhill threshold value corresponding thereto. PKU may instead be used in the comparison.

Similar to the uphill threshold values, since the downhill gradient that allows vehicle running under cutoff-cylinder operation using engine brake effect increases as the gear number decreases (as the gear ratio increases), the downhill threshold values are also set to be increased with decreasing gear number such that cutoff-cylinder operation is less likely to be prohibited. In other words, the critical points in downhill gradient beyond of which the vehicle must accelerate are obtained for each gear and are set as the downhill threshold values for the respective gears. The reason why the downhill threshold values are set to be increased with increasing vehicle speeds, i.e., the reason why they are set such that the cutoff-cylinder operation is less likely to be prohibited, as shown in FIG. 13, is that, in case of downhill, the characteristics are opposite to those shown in FIG. 11.

Returning to the explanation of FIG. 10, when the result in S210 is negative, since the result in S200 is also negative, it can be determined that the vehicle run on a level road and the program proceeds to S212 in which it is determined whether the value of the uphill-cutoff-operation-prohibiting timer has reached zero. When the result is negative, the program proceeds to S208 to continuously request to prohibit cutoff-cylinder operation. When the result is affirmative, on the other hand, the program proceeds to S214 in which it is determined whether the value of downhill-cutoff-operation-prohibiting timer has reached zero.

When the result is negative, the program proceeds to S208. When the result is affirmative, on the contrary, the program proceeds to S216 in which the bit of the cutoff-operation-prohibiting-request flag is reset to 0. To reset the bit of this flag indicates that the request of full-cylinder operation is withdrawn and the cutoff-cylinder operation becomes not prohibited.

On the other hand, when the result in S210 is affirmative, since this indicates that the vehicle is determined to run on a downhill whose gradient is equal to or greater than the corresponding downhill threshold value, the program proceeds to S218 in which it is determined whether the cutoff-cylinder operation is being prohibited, more specifically it is determined whether the bit of the cutoff-operation-prohibiting-request flag is set to 1. When the result is negative, the program proceeds to S220 in which it is determined whether cutoff-cylinder operation is in progress. When the result in S218 is affirmative, the program skips the processing at S220.

When the result in S220 is negative, since this means that full-cylinder operation is in progress, the program proceeds to S222 in which a predetermined value (indicative of a predetermined period of time) is set on the downhill-cutoff-operation-prohibiting timer to start time measurement. The program then proceeds to S224 in which the uphill-cutoff-operation-prohibiting timer is cleared since it is no longer necessary, and to S208 to request to prohibit cutoff-cylinder operation.

When the result in S220 is affirmative and hence it is determined that cutoff-cylinder operation is in progress, the program proceeds to S226 in which it is determined whether the accelerator position AP is equal to or greater than a threshold value, e.g., 1.3% (when defining no depressed position as 0% and fully-depressed position as 100%), in other words, it is determined whether the accelerator pedal 102 is returned. When the result is negative, the program proceeds to S228 in which it is determined whether brake switch 110 generates the ON signal, in other words, it is determined whether brake pedal 106 is manipulated. This brake manipulation includes that performed by the operator and that made by the ECU 130 to maintain the desired inter-vehicle distance during the preceding vehicle follow-up control or to avoid a collision.

When the result is affirmative, the program proceeds to S230 in which it is determined whether the deceleration of vehicle exceeds a threshold value, e.g.,—0.4 [m/sec$^2$], in other words, it is determined whether the deceleration of vehicle is large to exceed the threshold value in the negative direction. In the processing at S230, the determination is performed by calculating the acceleration of gravity in a negative value and by comparing it with the threshold value, i.e., this is done, in fact, by calculating the difference of the vehicle speed V and by comparing it with the threshold value.

When the result is affirmative, the program proceeds to S222. As a result, the program then proceeds to S208, via S224, in which the bit of the flag is set to 1 to request to prohibit cutoff-cylinder operation. On the other hand, when the result in S226 is affirmative, or when the result in S228 or S230 is negative, the program proceeds to S216 in which no request to prohibit cutoff-cylinder operation is made and cutoff-cylinder operation is accordingly continued.

Figure 14:
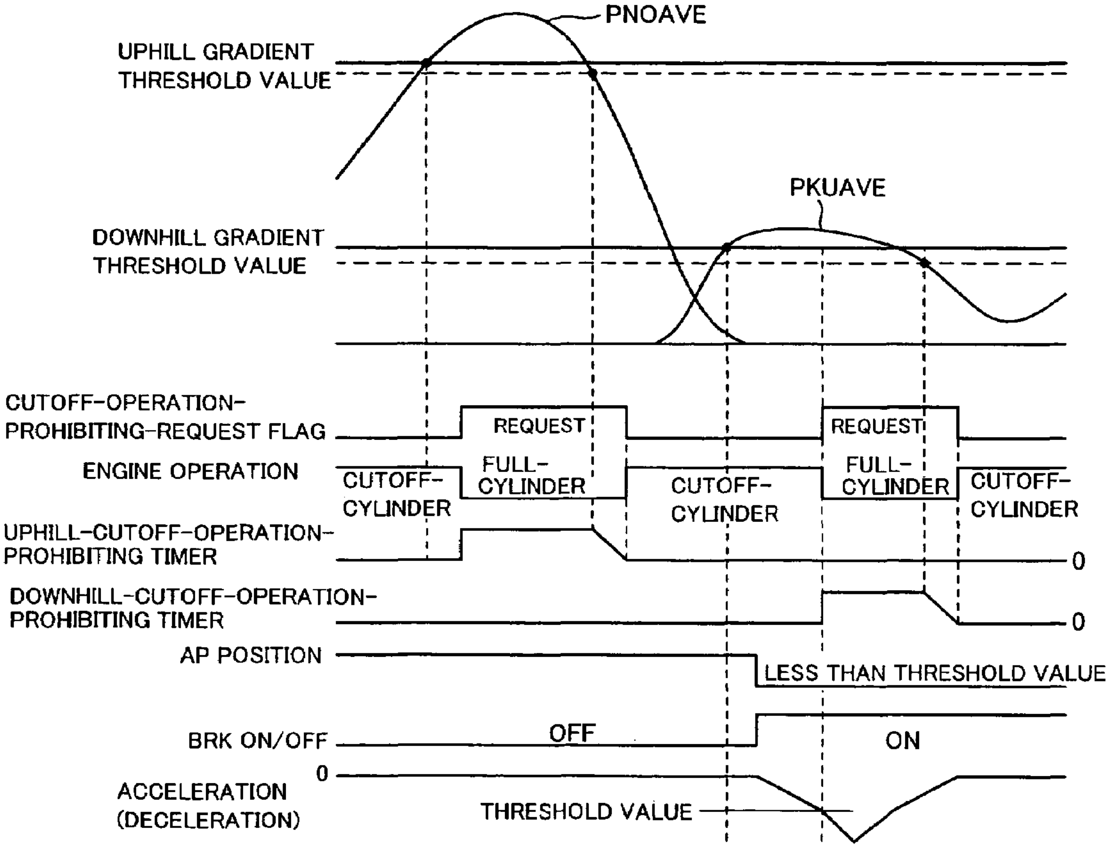
FIG. 14 is a time chart showing the processing of the flow chart of FIG. 10.

FIG. 14 is a time chart showing the processing of the flow chart of FIG. 10. Again explaining the processing with reference to FIG. 14, the request to prohibit cutoff-cylinder operation (i.e., the request of full-cylinder operation) is made when the uphill gradient is equal to or greater than the corresponding one of the threshold values (S200 to S208). Although not shown in FIG. 11, each threshold value including that for downhill is assigned with a hystresis.

With this, it becomes possible to prevent the engine operation from being unnecessarily switched to cutoff-cylinder operation during uphill climbing in which the load of vehicle body is increased. Since each of the uphill threshold value for determining prohibition is set with respect to the vehicle speed and gear and is set differently from that for downhill, it becomes possible to determine appropriately the area in which cutoff-cylinder operation should be prohibited. In addition, it becomes possible to make an influence on the improvement of fuel consumption to a minimum extent. Since unnecessary repetition of coupling and slippage control in the torque converter lockup clutch mechanism L is avoided, it becomes possible to enhance the durability of the torque converter lockup mechanism L.

Further, once the request to prohibit cutoff-cylinder operation is made, the request is continued for a predetermined period of time if the uphill gradient is found to be less than the corresponding threshold value, even if the request is temporarily not needed. With this it becomes possible to avoid frequent switching from cutoff-cylinder operation to full-cylinder operation, and then again to cutoff-cylinder operation, thereby enabling to avoid control hunting.

Further, the request to prohibit cutoff-cylinder operation is not made immediately if the uphill gradient exceeds the corresponding threshold value during cutoff-cylinder operation, but is made after the engine operation is switched to full-cylinder operation (S202), and when the engine E is operated under cutoff-cylinder operation, the cutoff-cylinder operation is continued. With this, it becomes possible to prevent the operator from having an unpleasant feeling and to achieve an effect similar to avoidance of control hunting since frequent switching is prevented.

Further, as regards the control during downhill, the request to prohibit cutoff-cylinder operation (i.e., the request of full-cylinder operation) is also made when the downhill gradient is equal to or greater than the corresponding value (S210, S218 to S224, S208). When descending a downhill during cutoff-cylinder operation, since the friction of the engine E decreases under cutoff-cylinder operation, the engine braking effect (i.e., the degree of deceleration) becomes smaller than full-cylinder operation and in addition, the operator may occasionally feel acceleration depending on the downhill gradient. However, the configuration can avoid these drawbacks. It is also becomes possible to enhance the durability of the torque converter lockup mechanism L.

Further, once the request to prohibit cutoff-cylinder operation is made, the request is also continued for a predetermined period of time if the downhill gradient is found to be less than the corresponding threshold value (S210, S214), even if the request becomes temporarily not needed. With this, it becomes possible to avoid frequent switching from cutoff-cylinder operation to full-cylinder operation, and then again to cutoff-cylinder operation, thereby enabling to avoid control hunting.

Further, similar to the control during uphill, the request to prohibit cutoff-cylinder operation is not made immediately if the downhill gradient exceeds the corresponding threshold value during cutoff-cylinder operation, but is made after the engine operation is switched to full-cylinder operation (S220, S208), and when the engine E is operated under cutoff-cylinder operation, the cutoff-cylinder operation is continued. With this, it becomes possible to prevent the operator from having an unpleasant feeling and to achieve an effect similar to avoidance of control hunting since frequent switching is prevented.

Furthermore, when the accelerator pedal 102 is returned by the operator (S226), when the braking is made (S228) or when degree of deceleration exceeds the threshold value (S230), cutoff-cylinder operation is prohibited (S222, S208). In other words, the cutoff-cylinder operation is prohibited in response to the operator's instruction or to the requirement from the engine operation condition to that effect. With this, it becomes possible to perform the control as just like intended by the operator and to perform the downhill control appropriate in response to the operating condition of the engine E.

This embodiment is thus configured to have a system for controlling an internal combustion engine E having a plurality of cylinders and mounted on a vehicle, comprising: an engine operation switcher (ECU 130, S100 to S110) that switches operation of the engine between full-cylinder operation during which all of the cylinders are operative and cutoff-cylinder operation during which some of the cylinders are non-operative, based on at least the load of the engine: a gradient estimator (130, S12 to S36) that estimates a gradient of road (PNOAVE, PKUAVE) on which the vehicle runs; and a cutoff-operation prohibiter (130, S200 to S230) that prohibits the cutoff-cylinder operation when the estimated gradient is equal to or greater than a threshold value.

In the system, the engine E is connected to an automatic transmission T and the threshold value is set with respect to the vehicle speed (V) and gears (1st to 5th) of the automatic transmission and the threshold value is set to be different between that for an uphill road and that for a downhill road.

In the system, the cutoff-operation prohibiter restrains from prohibiting the cutoff-cylinder operation when the cutoff-cylinder operation is in progress (S218, S220), but prohibits the cutoff-cylinder operation when an accelerator pedal is returned (S226, S222, S224, S208), when a brake is manipulated (S228, S222, S224, S208), or when a degree of deceleration exceeds a threshold value (S230, S222, S224, S208)

In the system, the cutoff-operation prohibiter continues to prohibit the cutoff-cylinder operation for a predetermined period of time even when the estimated gradient becomes less than the threshold value (S212, S214, S208).

In the system, the gradient estimator estimates the gradient of road on which the vehicle runs by calculating a predicted acceleration (GGH) and an actual acceleration (HDELV) of the vehicle and by calculating a difference therebetween as the gradient.

The system further includes: a running controller (130) that performs running control including at least one of cruise control during which the vehicle is controlled to run at a desired vehicle velocity and preceding vehicle follow-up control during which the vehicle is controlled to run at a desired vehicle velocity to maintain a desired inter-vehicle distance from a preceding vehicle, in response to an instruction of an operator.

It should be noted in the above, although the gradient of road is determined by calculating the gradient parameter (PNOAVE, PKUAVE), it is alternatively possible to determine the gradient (in %) using an equation mentioned below.

$$\text{gradient}(\%) \approx \sin\theta \times 100$$

$$\approx \left[ \frac{\frac{\gamma \times \eta \times Te}{R} - \frac{\{VP(n) - VP(n-1)\} \times \{M + \Delta M\}}{\Delta t \times 9.8}}{M} - \mu - \frac{\lambda \times VP(n)^2 \times PA}{760 \times M} \right] \times 100$$

In the equation, γ: total gear-reduction ratio in the power transmission system; η: transmission efficiency; Te: generated torque [kg·m]; R: vehicle tire's dynamic radius [m]; VP(n): vehicle velocity [m/s] or [km/h] detected at a current time (detected at a current program loop); VP(n−1): vehicle velocity detected at a preceding time (detected at a preceding program loop); M: vehicle's weight [kg]; ΔM: equivalent mass of vehicle rotation system; Δt: elapsed period of time until VP(n) is detected after VP(n−1) was detected, i.e., program loop intervals of FIG. 10 flow chart [sec.]; μ: rolling resistance; and λ: drag coefficient.

As understood from the above, the value calculated from the equation becomes a positive value that increases with increasing gradient of an uphill when the vehicle ascends the uphill, becomes zero when the vehicle runs on a level road, and becomes a negative value that increases with increasing gradient of a downhill when the vehicle descends the downhill.

It should be noted in the above that, it is alternatively possible to determine the gradient by installing a gradient sensor(s) on the vehicle and by using a value detected therefrom.

It should also be noted in the above that the transmission T may be a Continuously Variable Transmission.

It should further be noted in the above that, although the throttle opening θTH is used as a parameter indicative of the load of the engine E, a desired torque may instead be used. In an engine in which fuel is directly injected into cylinder, for example, in other words a spark ignition engine in which gasoline fuel is injected directly into a combustion chamber or a compression ignition engine, the desired torque is usually determined from the engine speed, accelerator position, and so on. In such a type of engine, the desired torque may be used in lieu of the throttle opening. The same also applies to electric vehicles and the like.

It should further be noted that, although the engine E is described as that uses a gasoline fuel, it may be an engine that uses a diesel fuel.

Japanese Patent Application No. 2003-172008 filed on Jun. 17, 2003, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling an internal combustion engine having a plurality of cylinders and mounted on a vehicle, comprising:

an engine operation switcher that switches operation of the engine between full-cylinder operation during which all of the cylinders are operative and cutoff-cylinder operation during which some of the cylinders are non-operative, based on at least the load of the engine:

a gradient estimator that estimates a gradient of road on which the vehicle runs; and a cutoff-operation prohibiter that prohibits the cutoff-cylinder operation when the estimated gradient is equal to or greater than a threshold value.

2. The system according to claim 1, wherein the engine is connected to an automatic transmission and the threshold value is set with respect to the vehicle speed and gears of the automatic transmission.

3. The system according to claim 1, wherein the engine is connected to an automatic transmission and the threshold value is set to be different between that for an uphill road and that for a downhill road.

4. The system according to claim 1, wherein the cutoff-operation prohibiter restrains from prohibiting the cutoff-cylinder operation when the cutoff-cylinder operation is in progress, but prohibits the cutoff-cylinder operation when an accelerator pedal is returned.

5. The system according to claim 1, wherein the cutoff-operation prohibiter restrains from prohibiting the cutoff-cylinder operation when the cutoff-cylinder operation is in progress, but prohibits the cutoff-cylinder operation when a brake is manipulated.

6. The system according to claim 1, wherein the cutoff-operation prohibiter restrains from prohibiting the cutoff-cylinder operation when the cutoff-cylinder operation is in progress, but prohibits the cutoff-cylinder operation when a degree of deceleration exceeds a threshold value.

7. The system according to claim 1, wherein the cutoff-operation prohibiter continues to prohibit the cutoff-cylinder operation for a predetermined period of time even when the estimated gradient becomes less than the threshold value.

8. The system according to claim 1, wherein the gradient estimator estimates the gradient of road on which the vehicle runs by calculating a predicted acceleration and an actual acceleration of the vehicle and by calculating a difference therebetween as the gradient.

9. The system according to claim 1, further including:

a running controller that performs running control including at least one of cruise control during which the vehicle is controlled to run at a desired vehicle velocity and preceding vehicle follow-up control during which the vehicle is controlled to run at a desired vehicle velocity to maintain a desired inter-vehicle distance from a preceding vehicle, in response to an instruction of an operator.

10. A method of controlling an internal combustion engine having a plurality of cylinders and connected to the automatic transmission, and operation of operation of the engine being switched between full-cylinder operation during which all of the cylinders are operative and cutoff-cylinder operation during which some of the cylinders are non-operative, based on at least the load of the engine: comprising the steps of:

estimating a gradient of road on which the vehicle runs; and prohibiting the cutoff-cylinder operation when the estimated gradient is equal to or greater than a threshold value.

11. The method according to claim 10, wherein the threshold value is set with respect to the vehicle speed and gears of the automatic transmission.

12. The method according to claim 10, wherein the threshold value is set to be different between that for an uphill road and that for a downhill road.

13. The method according to claim 10, wherein the step of cutoff-operation prohibiting restrains from prohibiting the cutoff-cylinder operation when the cutoff-cylinder operation is in progress, but prohibits the cutoff-cylinder operation when an accelerator pedal is returned.

14. The method according to claim 10, wherein the step of cutoff-operation prohibiting restrains from prohibiting the cutoff-cylinder operation when the cutoff-cylinder operation is in progress, but prohibits the cutoff-cylinder operation when a brake is manipulated.

15. The method according to claim 10, wherein the step of cutoff-operation prohibiting restrains from prohibiting the cutoff-cylinder operation when the cutoff-cylinder operation is in progress, but prohibits the cutoff-cylinder operation when a degree of deceleration exceeds a threshold value.

16. The method according to claim 10, wherein the step of cutoff-operation prohibiting continues to prohibit the cutoff-cylinder operation for a predetermined period of time even when the estimated gradient becomes less than the threshold value.

17. The method according to claim 10, wherein the step of gradient estimating estimates the gradient of road on which the vehicle runs by calculating a predicted acceleration and an actual acceleration of the vehicle and by calculating a difference therebetween as the gradient.

18. The method according to claim 10, further including the step of:

performing running control including at least one of cruise control during which the vehicle is controlled to run at a desired vehicle velocity and preceding vehicle follow-up control during which the vehicle is controlled to run at a desired vehicle velocity to maintain a desired inter-vehicle distance from a preceding vehicle, in response to an instruction of an operator.

* * * * *

UNITED STATES PATENT AND TRADEMARK OFFICE

CERTIFICATE OF CORRECTION

PATENT NO. : 7,089,103 B2
APPLICATION NO. : 10/871766
DATED : August 8, 2006
INVENTOR(S) : Takehiro Katakura et al.

It is certified that error appears in the above-identified patent and that said Letters Patent is hereby corrected as shown below:

In the Claims:

In Claim 10, Column 16, line 62, replace "*operation of operation of*" with --*operation of*--

Signed and Sealed this

Thirteenth Day of March, 2007

JON W. DUDAS
*Director of the United States Patent and Trademark Office*